July 23, 1940. F. C. CASWELL ET AL 2,208,877
DOUGHNUT MACHINE
Filed Aug. 16, 1939 2 Sheets-Sheet 1

Inventor
Fred C. Caswell and
Alexander S. T. Lagaard

By Caswell + Lagaard
Attorneys

July 23, 1940.   F. C. CASWELL ET AL   2,208,877
DOUGHNUT MACHINE
Filed Aug. 16, 1939   2 Sheets-Sheet 2

Inventor
Fred C. Caswell and
Alexander S. T. Lagaard

Patented July 23, 1940

2,208,877

UNITED STATES PATENT OFFICE 2,208,877

DOUGHNUT MACHINE

Fred C. Caswell and Alexander S. T. Lagaard, Minneapolis, Minn., assignors to Dough-King, Inc., Minneapolis, Minn., a corporation of Minnesota Application August 16, 1939, Serial No. 290,450

8 Claims. (Cl. 53—7)

Our invention relates to doughnut machines and particularly to doughnut machines in which the doughnuts are progressed along a channel in a kettle throughout a circuitous course by means of the flow of the cooking liquid, and in which the doughnuts are inverted by a twisted doughnut turner. In such machines considerable velocity of the cooking liquid is required to invert the doughnuts when passing through the turner. However, considerably less velocity is required to propel the doughnuts up to the turner. Due to the fact that the doughnuts, when first deposited, are soft and easily distorted in shape the doughnuts flatten when the flow of the cooking liquid immediately following the doughnut former is sufficient to invert the doughnuts in the turner.

An object of the invention resides in providing a doughnut machine in which sufficient flow of the cooking liquid is procured for inverting the doughnuts in the turner and in which the flow is sufficiently reduced at the doughnut former to prevent deformation of the doughnuts.

Another object of the invention resides in providing flow dividing means including a drop plate on which the doughnuts are dropped and along which the doughnuts travel, which flow dividing means extends intermediate the height of the channel in which the doughnuts are deposited from a position rearwardly of the doughnut former and to a position in close proximity to the turner to divide the same into upper and lower passageways.

A feature of the invention resides in constructing the drop plate imperforate for a distance following the doughnut former so as to definitely maintain separate rates of flow in the said two channels.

Another object of the invention resides in providing means formed in the flow dividing means for positively dividing the rate of flow of cooking liquid in both of the channels.

Another object of the invention resides in providing in the channel a plate forming a continuation of the drop plate and extending up to the flow impelling means.

A still further object of the invention resides in forming a transverse slit between the drop plate and said second named plate through which the cooking liquid passes from the lower passageway to the upper passageway.

A feature of the invention resides in providing a gate for controlling the degree of opening of said slit.

Another object of the invention resides in arranging said gate in continuation of the drop plate.

A still further object of the invention resides in hinging said gate to the drop plate and arranging the free end of the gate to form in conjunction with the second named plate the slit leading to the upper passageway.

Other objects of the invention reside in the novel combination and arrangement of parts and in the details of construction hereinafter illustrated and/or described.

Figure 1:
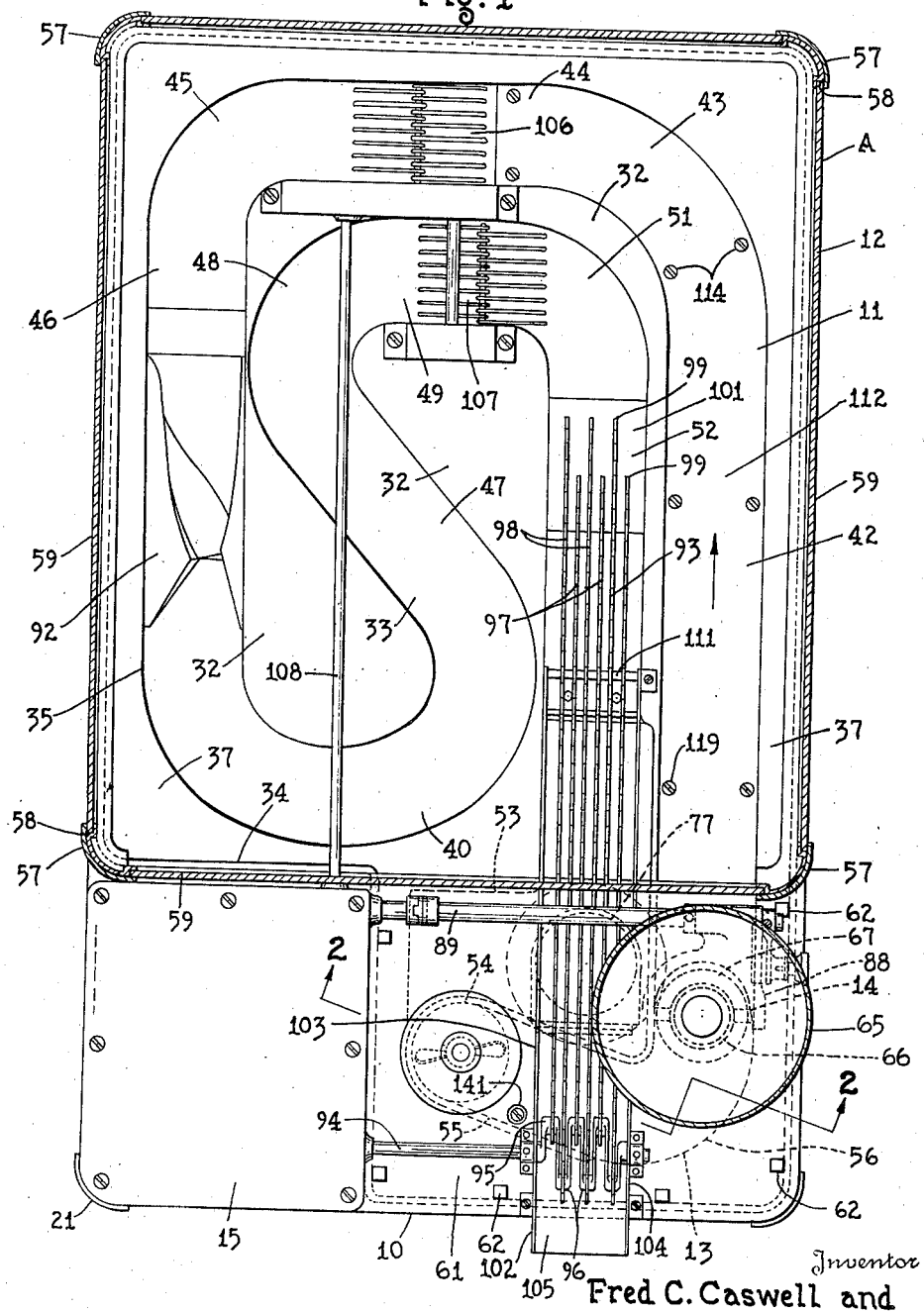
Fig. 1 is a plan sectional view of a doughnut machine illustrating an embodiment of our invention.

In the drawings we have shown a doughnut machine A which consists of a case 10 supporting a cooking kettle 11. A hood 12 superimposes the cooking kettle and covers a portion of the same leaving an extension 13 extending outwardly beyond said hood. Exteriorly of the hood 12 and above the extension 13 of the kettle 11 is a doughnut former 14 which forms and deposits raw doughnut formations into the portion of the channel in the kettle 11 disposed in the extension 13 thereof. A transmission disposed within a case 15, also situated exteriorly of the hood 12, operates the various parts of the invention. These various parts will now be described in detail.

Figure 2:
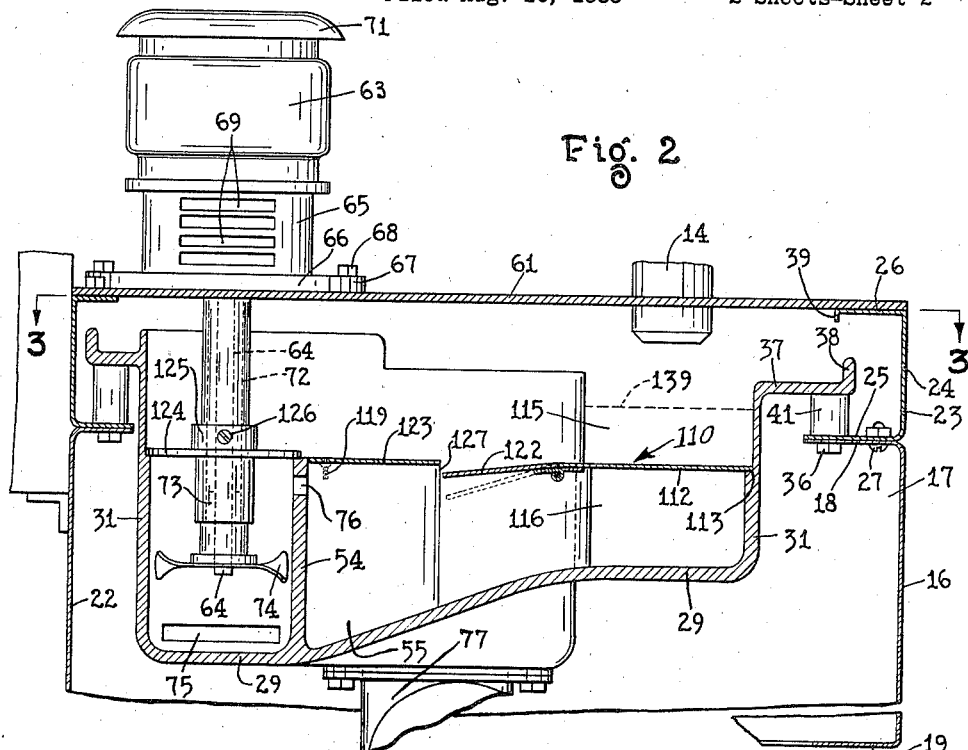
Fig. 2 is a fragmentary, elevational sectional view taken on line 2—2 of Fig. 1 and drawn to a greater scale.

The case 10 may be of any suitable construction and, as shown in Fig. 2, is formed of sheet metal. This case is constructed with side walls 16 and end walls 17 bent out of the sheet metal. At the upper and lower edges of the walls 16 and 17 are formed flanges 18 and 19 which stiffen the walls and form a rigid support for the kettle and other parts of the machine. Reinforcing corner post 21, attached to the walls 16 and 17 at the junctures thereof may also be used, if desired. In addition to the walls 16 and 17 an angular partition 22 is employed which is welded to the said walls and which serves to support the transmission 15 and also the extension 13 of the kettle 11. The lower flanges 19 may be supported on casters, legs, or any other suitable manner to hold the case at proper elevation above the floor on which the doughnut machine rests. Resting on the flange 18 is a supporting member 23 which is constructed with a web 24 and flanges 25 and 26 extending inwardly therefrom. Supporting member 23 extends about the walls 16 and 17 and the partition 22 and forms a support for the kettle 18. This supporting member is so constructed that the web 24 thereof lies in continuation of the walls 16 and 17 and partition 22 above which the supporting member is disposed. Said supporting member is attached to the case 10 by means of bolts 27.

Within the case 10 is disposed the cooking kettle 11, previously referred to, which is preferably of cast material and which is constructed with a bottom 29 and with vertical walls 31 extending upwardly therefrom. The vertical walls are connected at their upper ends with upper walls 32 and the various walls are so arranged as to form a channel 33 which extends throughout the major portion of the kettle and which provides a way along which the doughnuts may travel. The kettle 11 has one corner of the same removed, as designated at 34, to receive the transmission 15 leaving the main portion 35 confined within the hood 12 and the extension 13 projecting outwardly therefrom. The kettle 11 is constructed with a ledge 37 extending about the margin of the same which terminates in a lip 38, projecting upwardly from the extreme edge thereof. A guard 39 in the nature of a depending lip is formed on the flange 26 of the supporting member 23 and overlies the lip 38, thereby protecting the same. This lip being spaced from the lip 38 serves to retard transmission of heat from the kettle to the case. The kettle 11 is supported on the supporting member 23 through supporting blocks 41 which are cast integral with said ledge 37 and rest on the flange 25. Cap screws 36, screwed through the flanges 18 and 25 and into the blocks 41, hold the kettle in position.

The channel 33 is arranged to provide a straight run 42 which commences in close proximity to the end wall 17 adjacent the transmission in case 15. This run follows along the side wall 16 adjacent the doughnut former 14. The channel 33 at the end of the run 42 makes a curve 43 which leads into another straight run 44 following along the other end wall 17. At the end of this run the channel has a curve 45 which leads into still another straight run 46 which follows along the other side wall 16. At the end of the run 46 the channel is constructed with a loop 40 which communicates with a straight run 47 arranged diagonally of the kettle. The latter run communicates with a curved run 48 which in turn communicates with a straight run 49 parallel with the run 44. The run 49 communicates with another curved run 51 which, in turn, communicates with a straight run 52 parallel with and closely positioned with respect to the run 42. The run 52 discharges into a reservoir 53 which is merely an enlargement of said run. This reservoir is disposed in the extension 13 of the kettle. In this reservoir is provided a well 54 which communicates with a short run 55 also disposed in the extension 13. The run 42 extends outwardly beyond the hood 12 and into the extension 13 where the same is connected by means of a curved run 56 with the short run 55.

The hood 12 consists of four posts 57 which are attached to the supporting member 23 and which are provided with guide ways 58 which slidably support windows 59. A top is also used with the hood which covers the upper portion of the same, and which, in conjunction with the window, confines the space above the kettle 11. The extension 13 of kettle 11 is covered by means of a cover plate 61 which is attached to the flanges 26 of the supporting member 23 by means of bolts 62.

Attached to the plate 61 is a motor 63 provided with a vertical shaft 64. The motor 63 is mounted on a hollow tubular base 65 which is constructed with a flange 66 resting on the plate 61. The flange 66 has ears 67 projecting outwardly therefrom through which bolts 68 extend and which are threaded into the plate 61. The base 65 is constructed with ventilating openings 69 which supply air to the motor and assist in keeping the motor cool. A cap 71 on the motor protects the air vents in the upper portion of the motor. Extending downwardly from the flange 66 is a tubular housing 72 which projects into the well 54 and is concentrically disposed within the same. Shaft 64 is disposed within the tubular housing and is journalled at its lower end in a bearing 73 mounted in said housing. This shaft has attached to the lower end of the same a propeller 74 which serves to elevate the cooking liquid and discharge the same at an elevation above said propeller. An inlet port 75 is formed in the lower portion of the well 54 which communicates with the reservoir 53. An outlet port 76 near the upper portion of the well 54, communicates with the short run 55 which leads into run 42 of the channel 33.

At the lowermost portion of the machine is provided a cleanout 77, as shown in Fig. 1, which is used for removing the cooking liquid from the kettle 11 and also for removing the crumbs therefrom. This construction forming no feature of the instant invention has not been shown in detail in the drawings.

Situated at the beginning of the run 42 of channel 33 is the doughnut former 14, previously referred to, which comprises a receptacle 85 for dough and a cutter 86 connected therewith. Such construction being well known in the art will not be described in detail in this application. The cutter 86 includes a flanged sleeve 87 which severs dough extrusions from the mass contained in receptacle 85. This sleeve is reciprocated in opposite directions by means of a forked arm 88, which is mounted on a shaft 89. Shaft 89 is operated by a motor and the transmission enclosed within the transmission housing 15. Inasmuch as the driving mechanism for the shaft 89 does not form a feature of the instant invention, the same has not been illustrated. It will thus readily become apparent that doughnuts extruded from the doughnut former 14 are deposited in the flowing cooking liquid which travels along the run 42 of channel 43 in the direction of the arrow.

In the run 46 of channel 33 is arranged a twisted tubular turner 92. This turner inverts the doughnuts after the same have been cooked a predetermined length of time so that the said doughnuts may be cooked equally on both sides thereof.

In the run 52 of channel 33 is disposed an ejector 93 for removing the cooked doughnuts from the cooking liquid. This ejector comprises a shaft 94 which is constantly driven from the transmission within the housing 15. This shaft has mounted on it oppositely extending cranks 95 and 96. Sets of toothed blades 97 and 98 are mounted on the said cranks and are adapted to be alternately raised and lowered as the shaft 94 rotates. The lower ends 99 of these blades slide upon an inclined rest 101 which is mounted on the bottom 29 of the receptacle 11 in the portion of the run 52 thereof. It will be readily comprehended that, as the doughnuts reach the said blades, the doughnuts are elevated and progressed upwardly and outwardly of the cooking kettle 11. The ejector 93 is disposed within a trough 102 constructed with two side plates 103 and 104 and a bottom 105 at the discharge end thereof, which direct the doughnuts upon leaving the ejector outwardly of the machine.

For controlling the rate of travel of the doughnuts along the channel 43 two controlling devices 106 and 107 are employed. These control devices operate to allow the doughnuts, one at a time, to enter the turner 92 and the ejector 93. These control devices are operated by a shaft 108 driven from the transmission within the housing 15 and are moved periodically at predetermined intervals. Inasmuch as any desired construction may be used for this purpose and since this construction does not form a particular feature of the instant invention, the details thereof have not been shown, nor will the same be described specifically. Where the machine is of fairly large capacity, the control devices 106 and 107 may be omitted and the rate of flow of the cooking liquid utilized to time the cooking of the doughnuts.

The elevation of the cooking liquid in the kettle 11 is maintained by means of a dam 111 situated in the run 52 of channel 33 at the locality of the beginning of the reservoir 53. The cooking liquid in flowing through the channel 33 passes over this dam which serves as a wier and is maintained at a predetermined elevation thereby.

Figure 4:
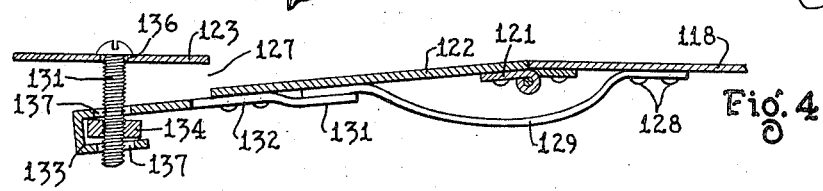
Fig. 4 is a detail sectional view taken on line 4—4 of Fig. 3 and drawn to a greater scale.
Figure 3:
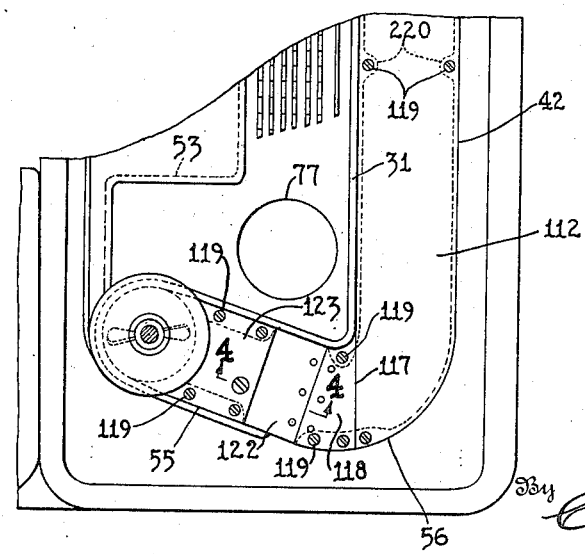
Fig. 3 is a plan sectional view of a portion of the structure shown in Fig. 1 with the cover removed, taken on line 3—3 of Fig. 2 and drawn to the same scale as Fig. 1.

The invention proper consists of flow dividing means 110 which is disposed in the runs 56, 42 and 43 and a portion of the run 44 of channel 33. The flow dividing means 110 is situated at an elevation intermediate the bottom 29 and the ledge 37 to divide the portion of the channel 33 in which it is situated into upper and lower passageways 115 and 116. This flow dividing means includes a drop plate 112 which is constructed from sheet metal and rests on a ledge 113 formed along the walls 31 of the kettle 11. The said drop plate is held in position by means of screws 114, screwed into enlargements 220 of the ledge 113. As best shown in Fig. 3 the drop plate 112 terminates along a line 117 continuous with the edge of one of the walls 31 of channel 42. Adjacent this edge is formed a short extension 118 of the drop plate which is separately supported and attached to the kettle in the same manner as the drop plate 112 by means of screws 119. This extension has hingedly connected to it, as shown in Fig. 4, by means of a piano hinge 121 a gate 122. This gate is movable toward and from a fixed plate 123 which extends up to the well 54. The plate 123 is constructed and supported in identically the same manner as the drop plate 112 by means of screws 119 which are threaded into the wall structure of the kettle. The plate 123 lies in the same plane as the drop plate 112 and the gate 122, when closed, is in coplanar relation with respect to both the drop plate 112 and the plate 123. The flow dividing means including the plate 123, drop plate 112 and extension 118 are imperforate and fit snugly upon the ledges 113 so that the flow in the two channels 115 and 116 may be definitely maintained. The plate 123 is situated above the port 76 so that the propeller 72 discharges the cooking liquid into the lower passageway 116. The upper portion of the well 54 is covered by means of a cover 124. This cover has a boss 125 on it through which the tubular housing 72 extends. A set screw 126 in said boss holds the cover 124 in position to close the upper end of the well and to force the cooking liquid through the port 76 and into the passageway 116.

When the gate 122 is lowered a slot 127 is formed between the free edge of the gate and the free edge of the section 123. Through this slot a certain amount of cooking liquid flows which causes propulsion of the cooking liquid in the passageway 115. The degree of opening of the slot 127 can be controlled as follows: Attached to the underside of the section 118 of the drop plate by means of rivets 128 is a leaf spring 129. This leaf spring engages with a finger 131, formed on an arm 132, secured to the underside of the gate 122. This finger permits the end of the leaf spring to slide and the leaf spring is so flexed that it normally forces the gate 122 away from the section 123 to make the opening 127 as large as possible. The arm 132 projects outwardly beyond the free edge of the gate 122 and is bent back upon itself to form a socket 133 in which is situated a nut 134 held from rotation by said arm. A screw 135 passes through an opening 136 in the plate 123 and through other openings 137 in the portion of the arm 132 forming the socket 133. This screw is threaded into the nut 134. When the screw is screwed in a clockwise direction gate 122 is raised and slot 127 decreased in area. When the screw is turned in the other direction, the said screw limits the downward movement of the gate 122 occasioned by spring 129 and permits of increasing the area of the slot 127. In this manner the degree of opening and the amount of cooking liquid passing into the passageway 115 can be controlled at will. By the use of a propeller 74 of proper pitch and by the disposition of the turner 92 and the dam 111 at suitable elevations, the elevation of the cooking liquid in the chamber 115 and the rate of travel thereof can be accurately controlled. It is to be noted, that the passageway 116 is at all times full of cooking liquid while the cooking liquid in the passageway 115 may be maintained at some height such as indicated at 139 in dotted lines in Fig. 2.

The operation of the invention is obvious. The cooking liquid is brought up to the desired temperature by heating means, not shown in the drawings, and so maintained throughout the use of the machine. Upon energizing motor 63 the cooking liquid is drawn from the reservoir 53 and discharged into the run 55 of channel 33. Where the speed of the motor or the capacity of the propeller is variable the same are adjusted until the proper rate of flow of the cooking liquid is procured to procure inversion of the doughnuts in the turner 92. The gate 122 is next adjusted by manipulation of screw 131 which can be accomplished by inserting a screw driver through an opening 141 in the plate 61 and rotating said screw.

When the required amount of flow in the passageway 115 is procured, the doughnuts move slowly away from the doughnut former 14 and cook properly so that distortion of the doughnuts, when they reach the control device 106 is prevented.

The advantages of our invention are manifest. A doughnut machine constructed in accordance with our invention is extremely simple and practical to operate requiring a minimum amount of attention on the part of the operator. Due to the construction of the drop plate and the mechanism associated therewith, accurate control of the flow of the cooking liquid in the passageways of the channel in which the doughnuts are deposited can be procured. With our invention crumbs are kept out of the lower passageway so that cleaning of the same is hardly ever required. With our invention any rate of flow can be had through the turner so that positive inversion of the doughnuts is procured. Adjustment of the flow through the upper passageway is readily controlled while the machine is in operation.

Changes in the specific form of our invention, as herein disclosed, may be made within the scope of what is claimed without departing from the spirit of our invention.

Having described our invention, what we claim as new and desire to protect by Letters Patent is:

1. In a doughnut machine in which the doughnuts are progressed along a channel through the flow of the cooking liquid, flow dividing means including an imperforate drop plate extending along a portion of the channel and dividing the same into upper and lower passageways, means for impelling the flow of liquid and directing the same into the lower passageway, and means providing a transverse slot in the flow dividing means for controlling the flow of liquid out of the lower channel and into the upper channel to impel the flow of cooking liquid in the upper channel.

2. In a doughnut machine in which the doughnuts are progressed along a channel through the flow of the cooking liquid, flow impelling means in the channel, said flow impelling means having a discharge outlet, flow dividing means including a drop plate and extending along a portion of the channel and up to the flow impelling means and dividing the channel into upper and lower passageways, said discharge outlet being situated below the flow dividing means to discharge the cooking liquid into the lower passageway, and means providing a transverse slot in the flow dividing means for controlling the flow of liquid out of the lower channel and into the upper channel to impel the flow of cooking liquid in the upper channel.

3. In a doughnut machine in which the doughnuts are progressed along a channel through the flow of the cooking liquid, flow impelling means in the channel, said flow impelling means having a discharge outlet, flow dividing means including a drop plate, said flow dividing means being substantially horizontal throughout its extent and extending along a portion of the channel and up to the flow impelling means, said flow dividing means dividing the channel into upper and lower passageways, said discharge outlet being situated below the flow dividing means to discharge the cooking liquid into the lower passageway, said flow dividing means having a transverse slot therein intermediate the ends thereof for controlling the flow of liquid out of the lower channel and into the upper channel to impel the flow of cooking liquid in the upper channel.

4. In a doughnut machine in which the doughnuts are progressed along a channel through the flow of the cooking liquid, flow impelling means in the channel, said flow impelling means having a discharge outlet, flow dividing means including a drop plate, said flow dividing means extending along a portion of the channel and up to the flow impelling means and dividing the channel into upper and lower passageways, said discharge outlet being situated below the flow dividing means to discharge the cooking liquid into the lower passageway, said flow dividing means including a gate forming in conjunction with a portion of the flow dividing means a transverse slot for controlling the flow of liquid out of the lower channel and into the upper channel to impel the flow of the cooking liquid in the upper channel, and means for guiding said gate for movement to vary the size of the slot.

5. In a doughnut machine in which the doughnuts are progressed along a channel through the flow of the cooking liquid, flow impelling means in the channel, said flow impelling means having a discharge outlet, flow dividing means including a drop plate, said flow dividing means extending along a portion of the channel and up to the flow impelling means and dividing the channel into upper and lower passageways, said discharge outlet being situated below the flow dividing means to discharge the cooking liquid into the lower passageway, said flow dividing means having a section intermediate the ends thereof hinged to one adjoining portion of said flow dividing means to constitute a gate adapted to swing downwardly below the adjoining portion of the flow dividing means and form a transverse slot in conjunction therewith for controlling the flow of liquid out of the lower channel and into the upper channel to impel the flow of cooking liquid in the upper channel.

6. In a doughnut machine in which the doughnuts are progressed along a channel through the flow of the cooking liquid, flow impelling means in the channel, said flow impelling means having a discharge outlet, flow dividing means including a drop plate extending along a portion of the channel, an extension on said drop plate, and a plate spaced from said extension and extending up to said flow impelling means, said flow dividing means dividing the channel into the upper and lower passageways, said discharge outlet discharging below said last named plate, a gate disposed between said extension and said last named plate, a hinge between said gate and extension, said gate forming in conjunction with said second named plate a transverse slot for controlling the flow of liquid out of the lower channel and into the upper channel to impel the flow of cooking liquid in the upper channel.

7. In a doughnut machine in which the doughnuts are progressed along a channel through the flow of the cooking liquid, flow impelling means in the channel, said flow impelling means having a discharge outlet, flow dividing means including a drop plate extending along a portion of the channel, an extension on said drop plate having a transverse edge disposed at the locality nearest said flow impelling means and a plate spaced from said extension and extending up to said flow impelling means, said last named plate having a transverse edge facing the edge of said extension, said flow dividing means dividing the channel into upper and lower passageways, said discharge outlet discharging below said last named plate, a gate disposed between said extension and said last named plate, a hinge connecting said gate with said extension and disposed in proximity to the denoted edge of the extension, said gate forming in conjunction with the denoted edge of said last named plate a transverse slot for controlling the flow of liquid out of the lower channel and into the upper channel to impel the flow of cooking liquid in the upper channel.

8. In a doughnut machine in which the doughnuts are progressed along a channel through the flow of the cooking liquid, flow impelling means in the channel, said flow impelling means having a discharge outlet, flow dividing means including a drop plate extending along a portion of the channel, an extension on said drop plate having a transverse edge disposed at the locality nearest said flow impelling means and a plate spaced from said extension and extending up to said flow impelling means, said last named plate having a transverse edge facing the edge of said extension, said flow dividing means dividing the channel into upper and lower passageways, said discharge outlet discharging below said last named plate, a gate disposed between said extension and said last named plate, a hinge connecting said gate with said extension and disposed in proximity to the denoted edge of the extension, said gate forming in conjunction with the denoted edge of said last named plate a transverse slot for controlling the flow of liquid out of the lower channel and into the upper channel to impel the flow of cooking liquid in the upper channel, said extension and last named plate being substantially horizontal and said gate swinging below said last named plate.

FRED C. CASWELL.
ALEXANDER S. T. LAGAARD.